SOUND REPRODUCING APPARATUS

Filed June 18, 1956

INVENTORS
LLOYD J. BOBB
ORLANDO TARABORRELLI
BY
Carl H. Synnestvedt
AGENT

United States Patent Office 2,964,595

Patented Dec. 13, 1960

2,964,595

SOUND REPRODUCING APPARATUS

Lloyd J. Bobb, Glenside, and Orlando Taraborrelli, Philadelphia, Pa., assignors to Philco Corporation, Philadelphia, Pa., a corporation of Pennsylvania Filed June 18, 1956, Ser. No. 591,867

5 Claims. (Cl. 179—100.41)

The invention herein described and claimed relates generally to sound reproducing apparatus and pertains more particularly to transducer devices. More specifically, the invention has to do with improvements in the electro-mechanical transducers of the type customarily used as phonograph pickups and in which movable elements, for example, bodies of piezoelectric material, serve as means for generating electrical energy waves in the reproduction of sound from phonograph records.

The availability of two general kinds of phonograph records commonly known as "long-play" records having a fine groove and as "standard-play" records having a coarser groove, makes it desirable to utilize a pickup adapted for use with either type of records. For that reason, a pickup cartridge is usually provided with two styli, one having a tip to fit the groove of long-play records, the other having a tip to fit the groove of standard-play records. For simplified and economical construction, it is customary to employ cantilever suspension means for the styli. Accordingly, it is common practice to provid the styli on arms which extend horizontally in different directions from a mounting chuck associated with an element adapted to convert mechanical energy derived from undulations of a record into electrical energy for the reproduction of sound.

However, pickups of this variety have disadvantages. For instance, when one of the two radially divergent styli is put to use, the other stylus which vibrates in air, brings about objectionable peaks in the response characteristic. Also, the mechanical energy spent in driving the free stylus represents a loss in electrical energy so that the operation of the pickup in generating useful voltage is noticeably impaired.

It is, therefore, an object of this invention to overcome the above noted disadvantages and objectionable features by means of an improved arrangement whereby the desirable two-arm cantilever suspension may be utilized effectively.

It is also an object of the invention to provide a novel pickup construction having a distinctive combination of elements which results in positively assuring that the unused stylus will not interfere with proper operation of the stylus in use.

A characteristic feature of the invention resides in the provision of a dual-stylus pickup in which the styli are, in effect, parts of separate mechanical systems which are vibrationally isolated from each other.

The invention is further characterized in that two mechanical systems each of which incorporates a stylus, include structure devised for drivingly coupling each stylus with its own electrical energy generating element, as well as for preventing the stylus being used from setting up undesirable sympathetic vibrations in the unused stylus.

Generally stated, the above noted features and objects of the invention are achieved by a novel cooperation and association of elements which include an elongated member having spaced stylus-carrying portions, said member being supported at a portion between said stylus-carrying portions, and each stylus-carrying portion drivingly engaging its own transducer element.

In a preferred embodiment of a phonograph pickup cartridge constructed in accordance with the invention, two independently vibratile systems are integrated in a single unit, each system having its own electrical energy generating element, the generating elements being connected in parallel. This construction eliminates the need for switching means and reduces the effective impedance by one half.

In a more subordinate aspect, the invention includes advantageous features of construction and improved combination of parts, which will be fully set forth hereinafter with reference to the accompanying drawing in which.

Figure 1:
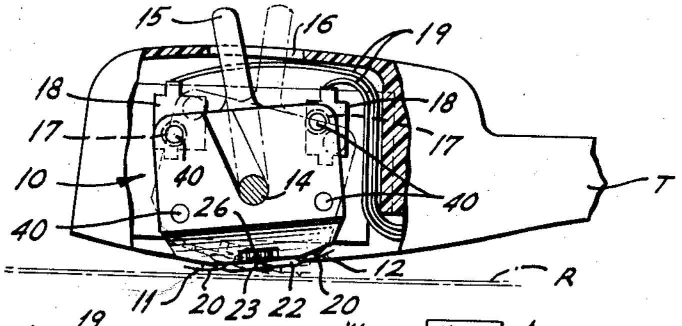
Figure 1 is a fragmentary side view (partly in section) of the head portion of a phonograph tone-arm supplied with a pickup cartridge constructed in accordance with the invention.

Having more particular reference to the drawing, there is shown a pickup cartridge 10 which is supported in a tone-arm T to cooperate with a record R, and which is supplied with two styli 11 and 12, one stylus having a tip dimensioned to fit the narrow and shallow groove of long-play records, the other stylus having a tip dimensioned to fit the wide and deep groove of standard play records. The pickup cartridge 10 is supported for movement about a generally horizontal pivot 14 to permit tilting of said cartridge either to the right or to the left, as viewed in Figure 1, so as to place one stylus in the record-playing field and the other stylus out of said field. To facilitate tilting of the pickup cartridge to its two operative positions, a finger-piece 15 is provided on said cartridge to protrude through an elongated opening 16 in the wall of the tone-arm head. A pair of spaced contacts 17 are carried by the pickup cartridge to move therewith while remaining in engagement with fixed terminals 18 which are mounted within the tone-arm head and electrically connected with a conventional audio system A (Figure 2) by means of leads 19.

As illustrated in the drawing, the styli 11 and 12 are located at and carried by opposite end portions 20 of an elongated member 22 which has an intermediate portion 23 affixed to a shank 24 so that said member forms two cantilever arms diverging radially from said shank. The member 22 is constructed in such manner that each of said arms has horizontal compliance to flex laterally with respect to the shank 24. In practice, the member 22 is advantageously made in the form of a flattened or ribbon-like spring bar with ends twisted at approximately 90°, said bar being so affixed to the shank that the flat sides of the twisted end portions lie in planes perpendicular to the longitudinal axis of said shank, and the flat sides of the main portion of said bar lie in planes parallel to said axis.

Figures 2, 3:
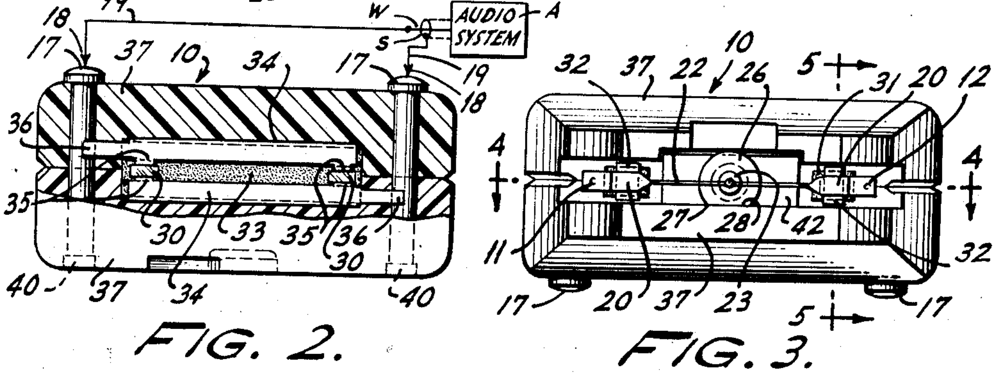
Figure 2 is an enlarged top view of the cartridge with a portion broken away to illustrate internal structure, and diagrammatically showing electrical connections of the cartridge.
Figure 3 is an enlarged bottom view of the cartridge shown in Figure 1.

That portion of the shank 24 which projects at right angle and beyond the member 22, is adapted for snug but removable engagement with a socket 25 provided in the pickup cartridge 10. To insure adequate seating of the shank and proper orientation of the styli, a collar or annular flange 26 is provided on the shank to abut the shank-receiving end of the socket 25. As best seen in Figure 3, the marginal edge of the collar or flange is formed with a flat side portion 27 corresponding to a flat side portion 28 on the cartridge. Because of this construction, the shank can be inserted in its socket for proper seating therein only when said flat side portions coincide with each other. Moreover, interengagement of these flat side portions prevents the shank from turning in its socket when either cantilever arm is laterally displaced in playing a record.

In particular accordance with the invention, a pair of transducer elements 30 are mounted in the cartridge 10, one of said elements being disposed for association with one cantilever arm, the other of said elements being disposed for association with the other cantilever arm. These elements 30 may, for example, be made of suitable known substances which exhibit the phenomenon of piezoelectricity, that is to say, a substance which produces an electric charge when subjected to mechanical stress and, conversely, undergoes mechanical deformation when a voltage is applied thereto. Substances having piezoelectric properties suitable for the purpose of this invention would be crystals of the common crystalline forms of Rochelle salts, or ceramics of the barium titanate variety. In the illustrated embodiment, ceramic material is preferred because the elements 30 can then be of comparatively small size and still suitable for high fidelity reproduction.

As seen in the drawing, the piezoelectric or transducer elements are in the shape of thin and narrow strips, and means is provided to effect a driving connection between one end portion of each element and the cantilever arm associated therewith. This driving connection is conveniently obtained by providing said one end portion of each element with a boot 31 of non-conductive material, and by providing each cantilever arm with a seat 32 disposed for snug engagement with the associated boot when the stylus assembly is properly positioned with respect to the cartridge. The boots 31 are advantageously constructed of rubber-like material so that they act to damp out undesirable sympathetic vibrations of the cantilever arm carrying the stylus which is not being used, as well as to transmit mechanical stress to the one piezoelectric or transducer element associated with the cantilever arm which has its stylus in riding engagement with the modulated groove of a record. As hereinbefore mentioned, the stylus-carrying arms have lateral compliance with respect to the mounting shank 24. Because of this compliance, the arm in use is positively driven without transmitting direct mechanical driving motion to the arm not in use.

The other end portion of each of said strip-like piezoelectric elements is embedded in a block 33 of non-conductive damping material, such as rubber or the like, so that said block supports said elements in spaced positions, and so that said block, said elements and said boots constitute a transducer unit which can be bodily housed within the cartridge 10. Conductors 34 are provided to effect electrical connection between the piezoelectric elements and the contacts of the pickup cartridge. These conductors are in the form of thin metal bands, one band extending along one side of the rubber block 33, the other band extending along the opposite side of said block. Each conductive band has a pair of tabs 35 and an end extension 36, the tabs being arranged in electrical contact with the piezoelectric elements, the end extension of one band being electrically coupled to one of the contacts 17 and the end extension of the other band being electrically coupled to the other of said contacts.

As represented in Figure 2, the leads 19 associated with the terminals 18 in engagement with the cartridge contacts 17, are electrically coupled with a conventional audio system A through a shielded cable, one of said leads being connected to the conductive wire W of the cable, the other of said leads being connected to the conductive shield S of said cable. Because of this electrical circuit of which conductive bands 34 are parts, the piezoelectric elements are connected in parallel so that no siwtching circuit is required between said elements and so that said elements cooperate to produce increased electrical capacity and an improved response characteristic.

Figure 5:
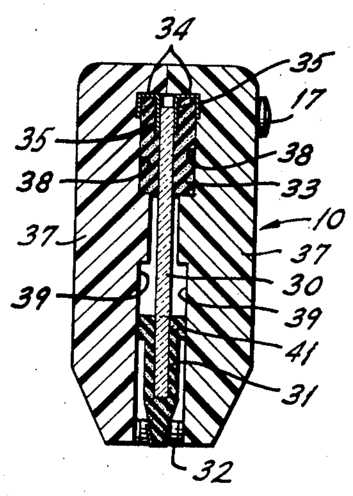
Figure 5 is a vertical sectional view taken approximately along line 5—5 of Figure 3.

As hereinbefore indicated, the transducer assembly or unit is adapted to be housed within the cartridge. For that purpose, the housing which defines the cartridge, conveniently comprises two complementary half sections 37 of non-conductive material, said sections having pairs of companion recessed portions indicated, in Figure 5, at 38 and 39 respectively. When the half sections are assembled as by means of rivets 40 or other suitable fastening elements, the pair of recessed portions 38 confront each other to constitute a chamber into which the block 33 fits and is clamped snugly to support the transducer unit, and the pair of recessed portions 39 cooperate to define channels for accommodating the piezoelectric elements 30 with the boots 31 thereon. It will be noted that the upper rivets 40 are formed with outwardly projecting heads which conveniently provide the contacts 17. It will also be noted that each boot 31 includes an enlarged part 41 which, in practice, can be separate bushings or made integral with the associated boot. These parts 41 are such that they bear on adjacent sides of the channels in which they lie so as resiliently to hold the piezoelectric elements in position within the housing and further to serve as means for controlling vibrations which could deleteriously affect the response characteristic.

Figure 4:
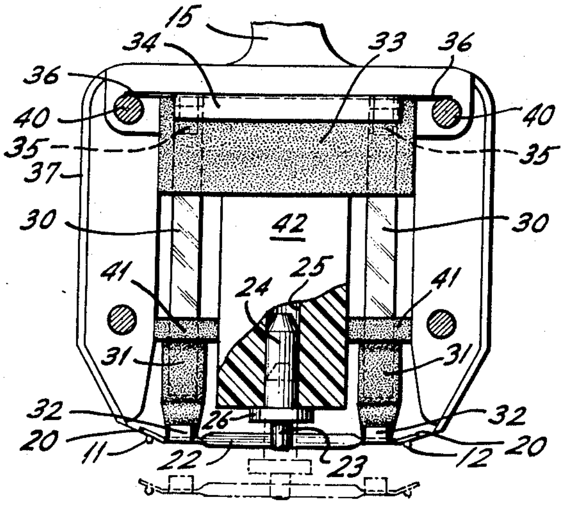
Figure 4 is a cross-sectional view taken approximately along line 4—4 of Figure 3.

As seen in Figure 4, one of the cartridge or housing sections 37 includes a protuberant portion 42 which is formed with a bore providing the hereinbefore mentioned socket 25 for slidably receiving the shank 24 of the stylus assembly. Because of this arrangement, the stylus assembly can be readily removed for repair or replacement whenever damage to parts thereof occur or when either stylus becomes so worn as to be no longer satisfactorily usable, although the pickup cartridge as such, may still be capable of satisfactory operation.

The above described embodiment of the invention is particularly advantageous in the reproduction of sound from phonograph records because the construction makes it possible to produce lightweight pickup cartridges which make it possible to play records satisfactorily at low needle pressure. Also, the construction is such that the pickup cartridge is economical to make and well suited for mass production since it requires but a few simple and easy assembled parts. While the arrangement shown and described is presently considered the preferred embodiment, it will be apparent to those skilled in the art that various changes and modifications in structural and assembly details can be made without departing from the gist of the invention. It is therefore contemplated, in the subjoined claims, to cover those changes and modifications which come within the true spirit and scope of the invention.

What we claim is:

1. In combination with a phonograph pickup housing adapted for placement in different operative positions to play phonograph records of different types, two separate piezoelectric elements mounted within said housing, means including two different styli, each stylus being associated in driving relation with one only of said elements, one stylus being connected with one piezoelectric element to activate the same when said housing is in one of said positions and the other piezoelectric element and its associated stylus are inactive, the other stylus being connected with said other element to activate the same when said housing is in the other of said positions and said one element and its associated stylus are inactive, and an electric circuit including said piezoelectric elements and conductors connecting said elements in parallel for applying the capacitive effect of the inactive piezoelectric element to the piezoelectric element being activated.

2. In combination with a phonograph pickup housing adapted for placement in different operative positions to play phonograph records of different types, two separate elongated piezoelectric elements each having one end anchored in said housing, a pair of arms each having one end portion anchored to said housing and each carrying a stylus at the other end portion, each stylus being associated in driving relation with one only of said elements, one of said arms being drivingly connected to the free end portion of one of said piezoelectric elements to activate said one of said elements when said housing is in one of said positions and said other of said elements and associated stylus are inactive, the other of said arms being drivingly connected to the free end portion of said other of said elements to activate said other of said elements when said housing is in the other of said positions and said one of said elements and its associated stylus are inactive, and an electric circuit including said piezoelectric elements and conductors at the anchored end portions of said elements to connect them in parallel for applying the capacitive effect of the inactive piezoelectric element to the piezoelectric element being activated.

3. The combination set forth in claim 2, in which boots of damping material are fitted over the mentioned free end portions of the mentioned piezoelectric elements, and in which the mentioned stylus-carrying end portions of the mentioned arms have seats for engagement with said boots.

4. In combination with a phonograph pickup housing adapted for placement in different operative positions to play phonograph records of different types, two separate elongated piezoelectric elements each having one end anchored in said housing and each having a free end portion extended in close proximity to a marginal edge of said housing, an elongated member anchored to and generally paralleling said edge and having stylus-carrying end portions, each stylus-carrying end portion being associated in driving relation only with one of said elements, one stylus-carrying end portion being connected with the free end portion of one piezoelectric element to activate the same when said housing is in one of said positions and the other piezoelectric element and its associated stylus are inactive, the other stylus-carrying end portion engaging the free end portion of said other piezoelectric element to activate the same when said housing is in the other of said positions and said one piezoelectric element and its associated stylus are inactive, and an electric circuit including said piezoelectric elements and conductive strips in contact with said anchored end portions of said elements to connect them in parallel for applying the capacitive effect of the inactive piezoelectric element to the piezoelectric element being activated.

5. The combination set forth in claim 4, in which blocks of damping material engage the mentioned anchored end portions of the mentioned piezoelectric elements, in which boots of damping material are fitted over the mentioned free end portions of said elements, and in which the mentioned stylus-carrying end portions have seats for engagement with said boots.

References Cited in the file of this patent

UNITED STATES PATENTS

| | | |
|---|---|---|
| 2,444,676 | Roberts | July 6, 1948 |
| 2,548,082 | Tourtellot | Apr. 10, 1951 |
| 2,570,578 | Martin | Oct. 9, 1951 |
| 2,771,513 | Jensen | Nov. 20, 1956 |
| 2,856,465 | Morrell et al. | Oct. 14, 1958 |

FOREIGN PATENTS

| | | |
|---|---|---|
| 156,666 | Australia | May 24, 1954 |
| 744,416 | Great Britain | Feb. 8, 1956 |
| 748,659 | Great Britain | May 9, 1956 |
| 775,987 | Great Britain | May 29, 1957 |
| 1,088,374 | France | Mar. 8, 1956 |